(12) United States Patent
Pidduck

(10) Patent No.: US 9,875,305 B2
(45) Date of Patent: *Jan. 23, 2018

(54) SYSTEM, METHOD AND COMPUTER PROGRAM PRODUCT FOR PROTECTING DERIVED METADATA WHEN UPDATING RECORDS WITHIN A SEARCH ENGINE

(71) Applicant: Open Text SA ULC, Halifax (CA)

(72) Inventor: Patrick Thomas Sidney Pidduck, Waterloo (CA)

(73) Assignee: Open Text SA ULC, Halifax (CA)

( * ) Notice: Subject to any disclaimer, the term of this patent is extended or adjusted under 35 U.S.C. 154(b) by 324 days.

This patent is subject to a terminal disclaimer.

(21) Appl. No.: 14/709,084

(22) Filed: May 11, 2015

(65) Prior Publication Data

US 2015/0317396 A1    Nov. 5, 2015

Related U.S. Application Data

(63) Continuation of application No. 13/591,644, filed on Aug. 22, 2012, now Pat. No. 9,058,335.

(60) Provisional application No. 61/528,990, filed on Aug. 30, 2011.

(51) Int. Cl.
*G06F 7/00* (2006.01)
*G06F 17/30* (2006.01)

(52) U.S. Cl.
CPC .. *G06F 17/30864* (2013.01); *G06F 17/30091* (2013.01); *G06F 17/30321* (2013.01)

(58) Field of Classification Search
None
See application file for complete search history.

(56) References Cited

U.S. PATENT DOCUMENTS

| 8,386,446 | B1 | 2/2013 | Pasupathy et al. |
| 9,058,335 | B2 | 6/2015 | Pidduck |
| 2004/0133544 | A1 | 7/2004 | Kiessig et al. |
| 2005/0267945 | A1 | 12/2005 | Cohen et al. |
| 2014/0181063 | A1 | 6/2014 | Pidduck |

OTHER PUBLICATIONS

Office Action for U.S. Appl. No. 13/591,644 (OPEN1790-1), dated Jun. 19, 2014, 10 pgs.
Notice of Allowance for U.S. Appl. No. 13/591,644 (OPEN1790-1), dated Feb. 10, 2015, 6 pgs.

*Primary Examiner* — Thu Nga Nguyen
(74) *Attorney, Agent, or Firm* — Sprinkle IP Law Group

(57) ABSTRACT

A search engine may maintain a list of derived metadata. When an event occurs that requires updating a search index, the search engine can determine which metadata is derived metadata and take appropriate actions with respect to the derived metadata. For example, if a request is received to update the index for a particular object, the search engine may protect the derived metadata from change while updating the other metadata in the index. As another example, if a request is received to update the text content for the object, the search engine may change the text content and the derived metadata. By identifying derived metadata, the search engine can protect the derived metadata from change when a request is received that otherwise causes metadata to change and can change the derived metadata when a request is received that would otherwise not change the metadata portion of the index.

20 Claims, 3 Drawing Sheets

SYSTEM, METHOD AND COMPUTER PROGRAM PRODUCT FOR PROTECTING DERIVED METADATA WHEN UPDATING RECORDS WITHIN A SEARCH ENGINE

CROSS-REFERENCE TO RELATED APPLICATION(S)

This is a continuation of, and claims a benefit of priority under 35 U.S.C. 120 of the filing date of U.S. patent application Ser. No. 13/591,644, filed Aug. 22, 2012, now U.S. Pat. No. 9,058,335, entitled "SYSTEM, METHOD AND COMPUTER PROGRAM PRODUCT FOR PROTECTING DERIVED METADATA WHEN UPDATING RECORDS WITHIN A SEARCH ENGINE," which is a conversion of and claims a benefit of priority from U.S. Provisional Application No. 61/528,990, filed Aug. 30, 2011, entitled "SYSTEM, METHOD AND COMPUTER PROGRAM PRODUCT FOR PROTECTING DERIVED METADATA WHEN UPDATING RECORDS WITHIN A SEARCH ENGINE," which are fully incorporated by reference herein.

TECHNICAL FIELD

This disclosure relates generally to the field of computerized search systems, and more particularly to systems, methods and products for protecting derived metadata when updating records in a computerized search system.

BACKGROUND OF THE RELATED ART

Advances in information technology (IT) continue to bring challenges to IT management. A push for IT management comes from dynamic needs of entities as they aim to manage large amounts of documents. Entities often employ document management systems to keep track of a vast amount of documents in the form of records. One issue faced by these businesses is the updating of information in reference to these documents.

Complicating this matter is the fact that entities may only need to search for particular records and update certain aspects of those records rather than the entirety of the record. For example, a record may contain both text content and metadata in addition to metadata derived from text. An entity may wish to perform a bulk replacement of the metadata for a record. However, current solutions will destroy any metadata derived from text content when bulk metadata replacement is performed. Additionally, solutions currently available to update document records tend to be time consuming and costly. Consequently, there is always room for innovations and improvements.

SUMMARY OF THE DISCLOSURE

This disclosure relates generally to the field of computerized search systems. More particularly, embodiments disclosed herein provide for a system, method and computer program product that can protect derived metadata when updating records in a computerized search system.

A computerized search system may comprise a search engine. This search engine may maintain a search index for objects (e.g., documents or other objects in a repository). The search index can include a metadata index and a text index. The metadata indexed in the metadata index may include derived metadata and other metadata. The search engine can maintain a list of derived metadata. When an event occurs that requires updating the index, the search engine can consult the list of derived metadata, determine which metadata is derived metadata, and take appropriate actions with respect to the derived metadata. By way of example, but not of limitation, if a request is received to update the metadata index for a particular object, the search engine may protect the derived metadata from change while updating the other metadata. As another example, if a request is received to update the text content for the object, the search engine may change the text content and the derived metadata. By identifying derived metadata, the search engine can protect the derived metadata from change when a request is received that otherwise causes metadata to change and can change the derived metadata when a request is received that would otherwise not change the metadata index.

One embodiment provides a computer program product that comprises a non-transitory computer readable medium having a set of computer instructions stored on it. The instructions are executable by a computer processor to perform a method essentially as described above.

Another embodiment provides a computerized search system comprising at least one non-transitory computer readable medium storing instructions translatable by at least one processor to perform a method essentially as described above.

Embodiments disclosed herein can provide many advantages. For example, by protecting derived metadata, search engines are better able to optimally and accurately update records. A user may be able to quickly update records by replacing only the necessary portion of the records. Thus, a search index may be able to circumvent slow update of records that may prove to be costly.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

Document management systems often employ a search engine to allow for fast retrieval of information. A search engine can search the metadata and text of documents in a search index to determine which documents match search criteria without having to parse the document itself.

When an object is added to a search system, two types of information may be indexed, one or both of full text and metadata. There are often many metadata fields for an associated object. The metadata may describe the objects being indexed. There can be various types of metadata, various ways metadata can be obtained and/or generated, as well as various ways to associate such metadata with certain objects which, in turn, can be of various types. Document records can be an example type of objects. If an object has or references text content, some metadata may be derived from the text content. This type of metadata can be referred to as derived metadata.

Derived metadata can be fragile in a search system. For example, suppose when an object that has or references text content is added to a search system, a software component in the search system analyzes the text content of the object and determines that the text content is generally positive, say, at 60%. This sentiment value of 60% is a type of derived metadata and is associated with the object in the search system. This derived metadata is indexed in a search index and is searchable by users of the search system to provide further insight about the object. However, this piece of valuable information may be lost when the index or the object is updated. This commonly happens if the metadata associated with the object is replaced, inadvertently also removing the derived metadata.

At this point, it may be helpful to discuss an example search system.

Figure 1:
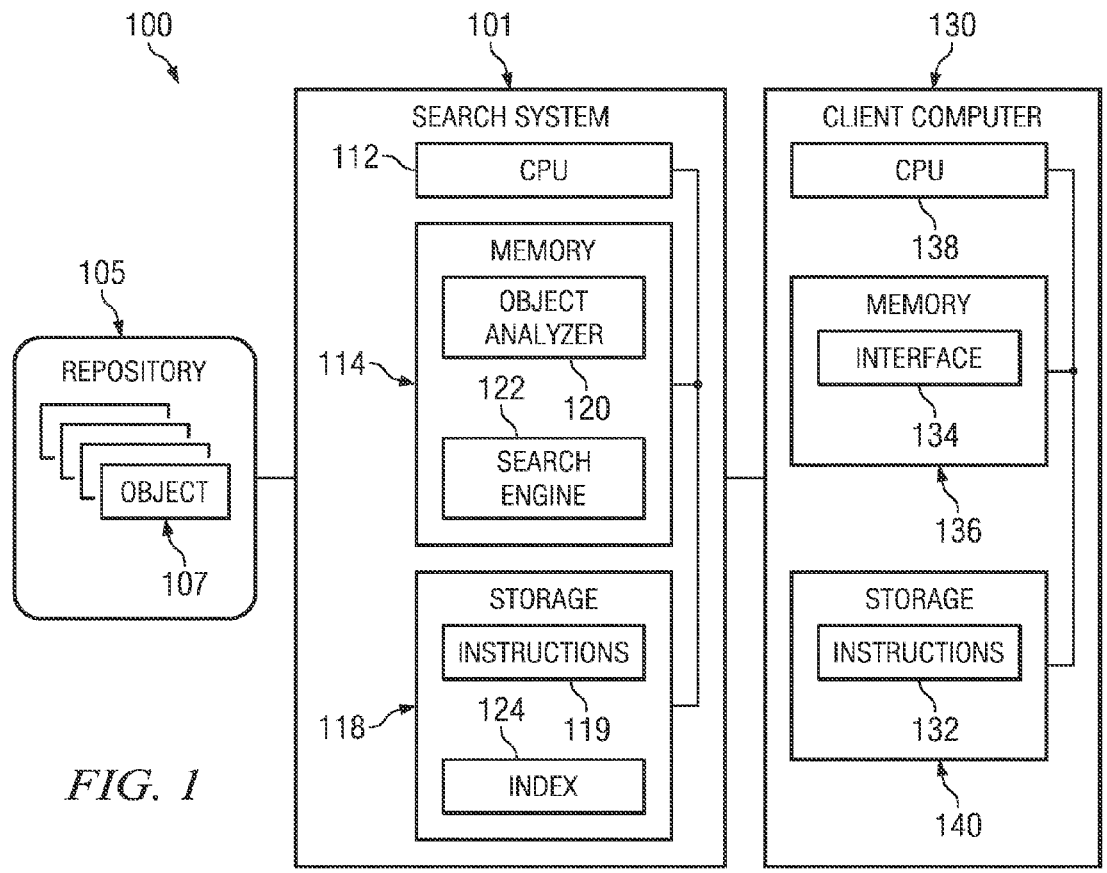
FIG. 1 depicts one embodiment of a computing environment in which one embodiment of a search system can be implemented.

FIG. 1 depicts a block diagram illustrating one embodiment of a computing environment 100 with object search system 101. Computing environment 100 includes an object repository 105 storing objects 107 of interest (documents, images, emails or other objects that may be searched). Object repository 105 may comprise a file server or database system or other storage mechanism remotely or locally accessible by search system 101.

In the embodiment of FIG. 1, search system 101 comprises a server having a central processing unit 112 connected to a memory 114 and storage unit 118 via a bus. Central processing unit 112 may represent a single processor, multiple processors, a processor(s) with multiple processing cores and the like. Storage unit 118 may include a non-transitory storage medium such as hard-disk drives, flash memory devices, optical media and the like. Search system 101 may be connected to a data communications network (not shown).

Storage unit 118 stores computer executable instructions 119 and index 124. Computer executable instructions 119 can represent multiple programs and operating system code. In one embodiment, instructions 119 are executable to provide an object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 includes metadata used to identify objects in response to a search query and may also include text used to identify objects. Index 124 can include a single index containing metadata and text, separate metadata and text indices or other arrangements of information. While shown as a single index, index 124 may include multiple indices.

Client computer system 130 may include components similar to those of the server of search system 101, such as CPU 138, memory 136, and storage 140. Additionally, client computer system 130 may include executable instructions 132 to provide a user interface 134 that allows a user to enter a search query. The user interface may be provided through a web browser, file system interface or other program.

The search system 101 of FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 analyzes objects in object repository 105 to determine information to be indexed in index 124. Object analyzer 120 can send indexing instructions to search engine 122 to direct search engine 122 to add/modify/or delete metadata or text in index 124, as discussed below. When a search query is received, search engine 122 can search the information in index 124 to identify objects responsive to the search query and return a list or other representation of those objects to client computer 130.

Figures 2, 4:
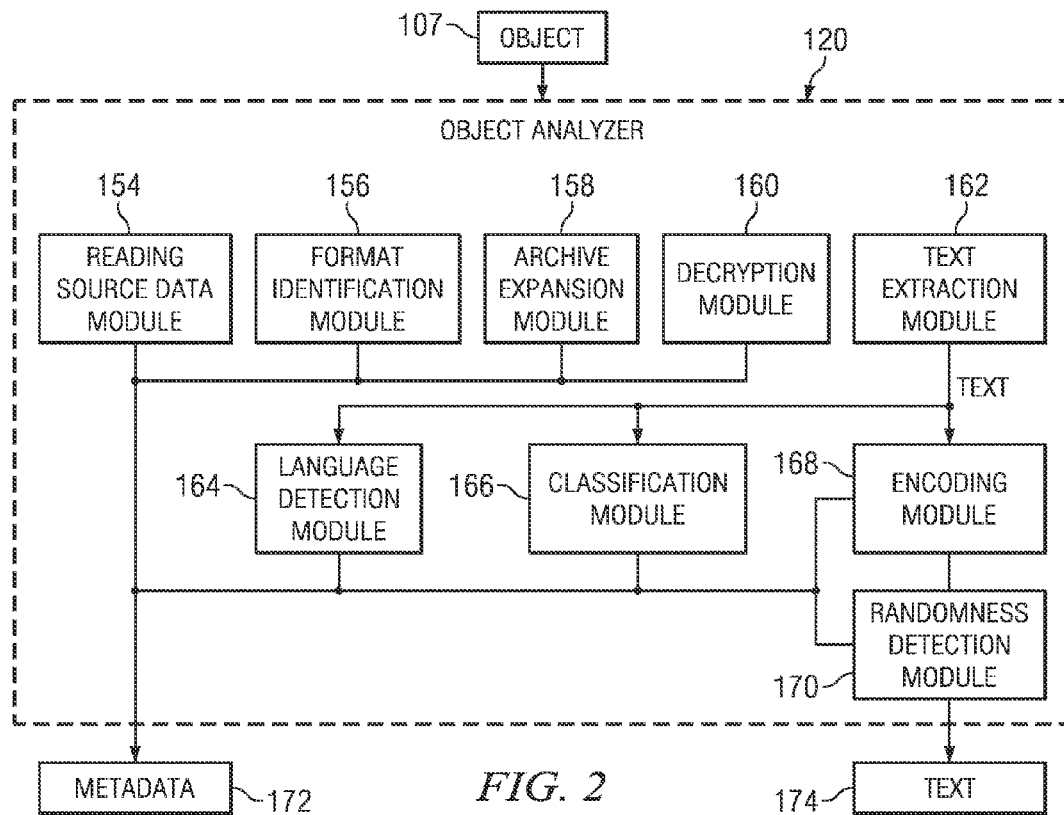
FIG. 2 depicts a functional block diagram illustrating one embodiment of an object analyzer.
FIG. 4 depicts a diagrammatic representation of one embodiment of regions or fields for a portion of an index.

FIG. 2 depicts a diagrammatic representation of one embodiment of an object analyzer 120 for analyzing an object 107. Object analyzer 120 can comprise various modules to process an object 107. Reading source data module 154 can open the object 107. Format identification module 156 examines the object to determine what type of file or data the object 107 comprises. Archive expansion module 158 unzips files or otherwise decompresses files if the object 107 is a compressed file. Decryption module 160 decrypts all or part of the data in the object 107. Text extraction module 162 applies rules to text in the object 107 to extract text for index 124. Language detection module 164 examines the text to determine the language in which the text is written. Classification module 166 applies rules based upon text and metadata to classify content. Encoding module 168 can convert text to a supported encoding. Randomness detection module 170 can analyze data to be indexed to reject random information.

Object analyzer 120 may include modules that can derive metadata for object 107. For example, a document management system may provide a limited amount of metadata with the object 107. Object analyzer 120 can derive other metadata from the metadata provided, text or other properties of the object 107. As a specific example, a filter or piece or code that extracts the text from a PowerPoint presentation might also create metadata about the presentation. In this example, the metadata which is not provided by the document management system and which is derived by object analyzer 120 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like. Further clarification of derived metadata is provided below with reference to FIG. 5.

The embodiment of FIG. 2 is provided by way of example. Object analyzer 120 may include any number of other modules to analyze an object and extract text 174 and metadata 172 to be indexed. Object analyzer 120 may be a portion of a larger program, such as a document management program, may be a separate program or may be implemented according any suitable programming architecture. In one embodiment, the process of determining metadata 172 and text 174 to be indexed may be carried out by any number of different programs on a computer system or distributed across computer systems.

Metadata 172 and text 174 thus processed by object analyzer 120 may be provided to a search engine. An example search engine will now be described with reference to FIG. 3.

Figure 3:
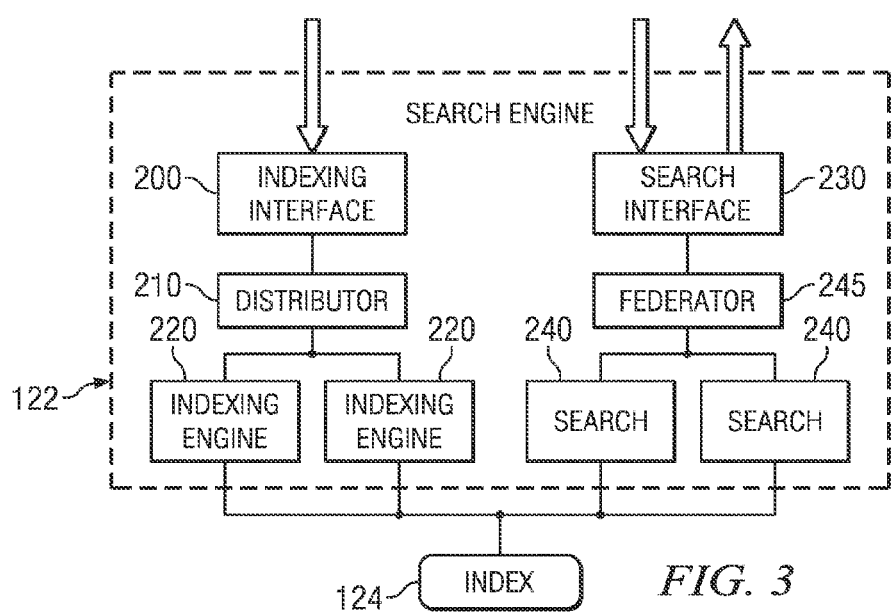
FIG. 3 depicts a functional block diagram illustrating one embodiment of a search engine.

FIG. 3 depicts a diagrammatic representation of logical blocks for one embodiment of a search engine 122. Search engine 122 may provide an indexing interface 200 that receives indexing requests (e.g., from object analyzer 120) or other source. A distributor module 210 may distribute the indexing requests to indexing engine 220 that act on an indexing request to update index 124. Search engine 122 may also include a search interface 230 to receive queries (e.g., from a document management system or other source). Search interface 230 may send queries to search modules 240. Federator 245 gathers the results from all search modules together, and generates a response to the query received through search interface 230. Search modules 240 are responsible for performing searches on an index partition, and performing tasks such as computing relevance score, sorting results, and retrieving metadata regions to return in a query.

Search interface 230 may be configured to receive a search query from a user, and search index 124 for objects that meet the criteria set forth in the search query. Query language may also be configured to permit sorting results of a search. Various rules may be used to determine the sort order. In this example, a user constructed the search query.

It should be noted, however, that the user could be any system that issues queries to the search system, and may include other computer programs searching on behalf of other users, creating reports or running automatic processes. Additionally, as described above, there can be many different types of metadata in the search index. Thus, the search queries are not restricted to "text" based search terms.

In the context of this disclosure, the phrase "search term" represents a technical concept or interpretation. For example, a search term in the context of this disclosure can be a word, a string, or any combination of the following:

phrases
numbers
strings
logical operations (e.g., AND, OR, NOT, etc.)
ordering or operations (e.g., using parenthesis)
relationships (e.g., greater than, less than, not equal to, etc.)
similarities based on thesaurus, stemming, sounds-like, etc.
wildcards and pattern matching To this end, a search term can also refer to any term that is used in a query and that has been modified or generated by any commonly used techniques.

For context, a search term could be a word "John" or a more complex expression like: (>"bob" or !=("123" or a*)) and (sounds-like "smith" or thesaurus "doctor" or "medical doctor" or stem "medical").

The embodiment of FIG. 3 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according to any suitable programming architecture. In one embodiment, the processes of search engine 122 may be distributed across multiple computer systems. Furthermore, while in FIG. 3, index 124 is illustrated as a single index, index 124 may comprise a set of smaller indexes. For example, a separate index can be used by each indexing engine.

FIG. 4 depicts a diagrammatic representation of one embodiment of regions or fields for a portion of index 124. Index 124 includes a list of some or all objects 107 in repository 105 (FIG. 1), each identified by a unique identifier 301 (also referred to as object ID). Index 124 further includes a set of metadata regions 300 (also referred to as metadata fields). A metadata field 300 may include more than one entry for an object. The metadata fields can each have associated values in value storage locations within storage unit 118. In other embodiments, the values may be discarded. The index may include a list of dictionary terms contained in the metadata values of the object and pointers to where the metadata values corresponding to the field are stored. Index 124 may also include other regions for an object, such as a text region 302. Text region 302 may, example, include a list of terms in the text of an object.

While shown as a single index, index 124 may be partitioned. In index partitioning, in one embodiment, the index of objects in repository 105 may be split into multiple indexes such that some objects are listed in one index partition, while other objects are listed in the other index partitions. Index partitioning may also reduce resource usage and search time. Furthermore, separate indexes may be maintained for metadata and text and/or different metadata regions or fields. Index 124 can be stored according to any suitable storage scheme.

Figure 5:
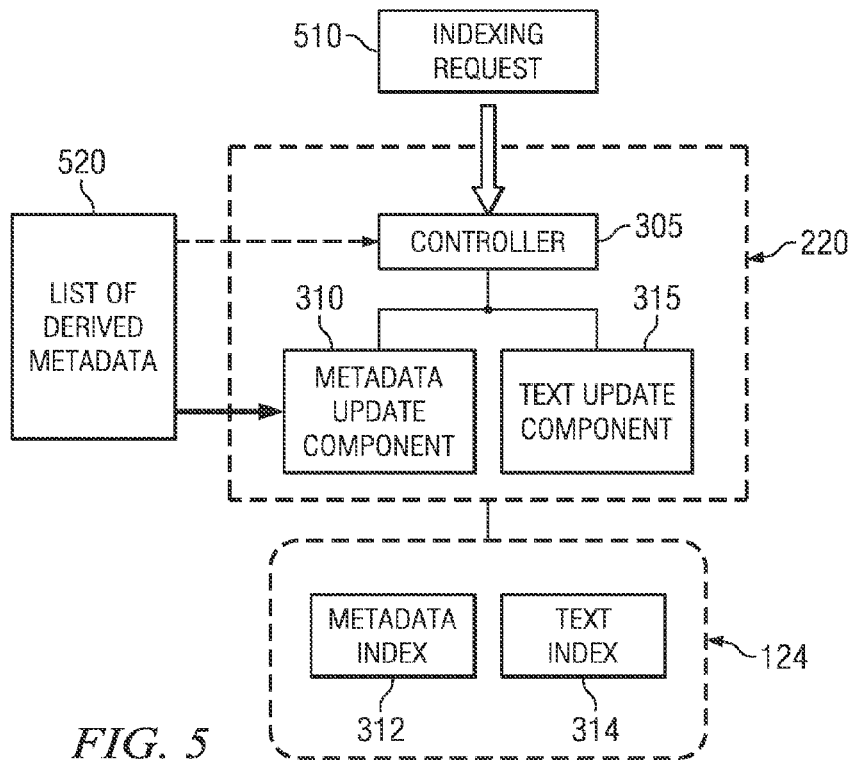
FIG. 5 depicts a functional block diagram illustrating one embodiment of an indexing engine.

FIG. 5 depicts a diagrammatic representation of one embodiment of an indexing engine 220 to maintain index 124. In this embodiment, indexing engine 220 can include an indexing controller 305, a metadata update component 310, a text update component 315, and a derived metadata list 520. In this embodiment, index 124 is maintained as a separate metadata index 312, which contains metadata for objects in repository 105, and text index 314, which contains content text from objects in repository 105.

Indexing controller 305 receives indexing requests (e.g., from a distributor, another application or other source). An indexing request received at the indexing controller 305 may include an instruction to add an object, delete an object, modify an object or replace an object in index 124. Such an indexing request may also include the information to be added or changed, such as the full text content to be indexed and the associated metadata for the object. An indexing request may also contain derived metadata.

The text (derived text or full text content) of an indexing request may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request may specifically be provided by an application providing the indexing request. This might be data such as an identifier for the object, the date or time it was first added to the system, or the identity of the user who manages the object.

Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written. Derived metadata may also include data inferred from processing an object. For example, in processing a PowerPoint presentation, derived metadata may include a timestamp of the time the PowerPoint was processed or the location where the PowerPoint presentation was processed.

In one embodiment, a derived metadata list 520 may be a record of any known metadata fields that have been derived from the text which is indexed. In one embodiment, this list may be consumed by metadata update component 310 of indexing engine 220 to provide guidance on whether a given metadata field must be replaced or deleted as if it were part of the text data.

An indexing engine can receive an indexing request 510 from an application, distributor or other source. Indexing request 510 specifies an operation to be taken on index 124 for an object and any metadata or text for that action. For context, an application that generates an indexing request may be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add.

AddOrReplace: this function may distinguish between content and metadata. If an object already exists, and metadata only is provided, the existing full text content is retained.

AddOrModify: this operation will update an existing object, or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 305, according to one embodiment, is a component which interprets the indexing request to determine how it should be processed. Indexing controller 305 can identify whether a text indexing command exists, and, if so, send the command with the necessary parameters to the text update component 315. Indexing controller 305 can likewise determine if any metadata indexing operations are required, and if so, send the command with necessary parameters to the metadata update component 310.

Text update component 315 is responsible for processing requests to index full text content. This may include tasks such as maintaining a dictionary of search terms, maintaining the internal search data structures, and updating the storage representation of the text portion of the search index in memory or on disk as appropriate. Text update component 315 may support instructions such as Add an Object, Replace an Object, or Delete an Object. Non-limiting examples of instructions supported by text update component 315 are further described below.

Metadata update component 310 is responsible for processing requests to index metadata 312 associated with an object in index 124. This may include building and maintaining dictionaries of search terms, maintaining internal search data structures, and updating the representation of the metadata portion of the search index in memory or on disk as appropriate. Metadata update component 310 may support instructions such as Add an Object, Replace an Object, or Delete an Object. Non-limiting examples of instructions supported by metadata update component 310 are further described below.

Figure 6:
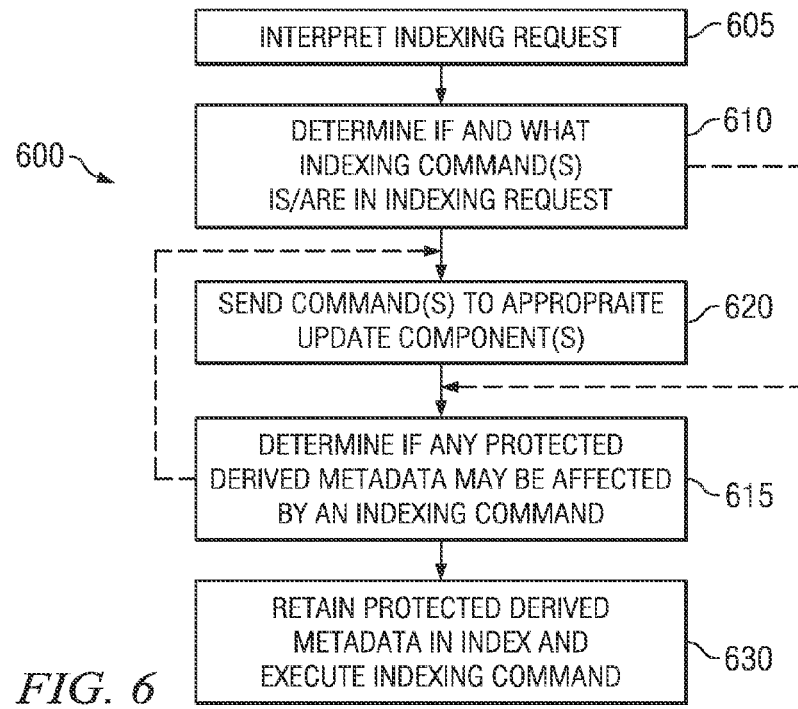
FIG. 6 depicts a flow diagram illustrating one embodiment of a method for processing an indexing request and protecting derived metadata of interest from being affected thereby.

As an example, in one embodiment, indexing request 510 sent by distributor 210 to indexing engine 220 may contain an instruction to add an object of a text type. Indexing request 510 may be received by indexing controller 305 of indexing engine 220. Referring to FIG. 6, indexing controller 305 may operate to parse and analyze indexing request 510 (step 605) and determine what, if any, type of command is in indexing request 510 (step 610). Indexing request 510 may contain a text indexing command, a metadata indexing command, or both. Indexing engine 220 may further comprise text update component 315 and metadata update component 310 coupled to indexing controller 305. In one embodiment, when indexing controller 305 detects that indexing request 510 contains a metadata indexing command, indexing controller 305 may access derived metadata list 520 and determine whether the metadata indexing command applies to or otherwise affects any derived metadata in index 124 that should be protected from change (step 615). As will be explained below, this may involve using a pattern matching technique to identify any metadata field name in index 124 that is affected by the metadata indexing command and that matches a derived metadata field from derived metadata list 520. Indexing controller 305 may then forward the metadata indexing command (step 620) along with any metadata field name thus identified to metadata update component 310. In one embodiment, step 615 may be performed by metadata update component 310 after receiving a metadata indexing command from indexing controller 305 (step 620). In this embodiment, indexing controller 305 may determine what, if any, type of command is in indexing request 510 (step 610) and forward the indexing command(s) to metadata update component 310, to text update component 315, or both. Metadata update component 310, in turn, may access derived metadata list 520 and determine whether the metadata indexing command applies to or otherwise affects any derived metadata in index 124 that should be protected from change (step 615).

In one embodiment, index 124 comprises a set of indices including metadata index 312 and text index 314. Metadata update component 310 may retain derived metadata, identified as being protected using derived metadata list 520, in metadata index 312 and execute the metadata indexing command to update metadata index 312 without changing the protected derived metadata (step 630). Likewise, metadata update component 310 can execute metadata indexing commands to update the derived metadata fields in metadata index 312 even though the indexing request 510 only contains a request to update text index 314.

Non-limiting examples of instructions supported by metadata update component 310 and text update component 315 will now be described below.

To replace a text object, indexing request 510 may contain an instruction to replace only the text of an object. In one embodiment, a pre-processing step, such as processing shown in FIG. 2, may analyze the text to obtain derived metadata associated with the object, and include this derived metadata in indexing request 510. Indexing controller 305 may then send the instruction to both text update component 315 and metadata update component 310. Text update component 315 can update text index 314 with the new data. Metadata update component 310 determines that this is a text update request. Metadata update component 310 may examine derived metadata list 520 and may filter the available metadata in metadata index 312 against derived metadata list 520, and replace only the metadata that may be derived from the text of the object.

As an example, indexing request 510 may contain an instruction to delete only the text of an object. In one embodiment, indexing controller 305 may send a command to text update component 315 to delete the text of the object from text index 314. Indexing controller 305 may also send a command to metadata update component 310 to delete the text of the object. Metadata update component 310 reads derived metadata list 520 and deletes the values for each of the derived metadata fields associated with the object if they exist in metadata index 312.

As another example, indexing request 510 may contain an instruction to replace all the metadata for an object. In one embodiment, indexing controller 305 may send a command to metadata update component 310, along with necessary parameters, to replace only the metadata for the object. Metadata update component 310 may compare the existing metadata in metadata index 312 against derived metadata list 520. According to one embodiment, metadata fields specified in derived metadata list 520 are considered protected. Consequently, metadata update component 310 will not erase or modify values in metadata index 312 that have been identified per derived metadata list 520 as being associated with the protected metadata fields.

As another example, indexing request 510 may contain an instruction to delete only the metadata of an object. Indexing controller 305 may send a command to metadata update component 310 to delete only the metadata of the object. According to one embodiment, metadata update component 310 reads derived metadata list 520 and deletes values for all metadata fields in metadata index 312 for the particular object except for the metadata fields identified per derived metadata list 520 as being protected.

In one embodiment, pattern matching may be used to identify derived metadata fields. For example, a value of 'OTDoc*' in derived metadata list 520 may ensure that any metadata field name that starts with the characters 'OTDoc' may be considered to be derived metadata. A derived metadata field name of 'OTDoc*!OTDocCAR' indicates that any metadata field name that begins with OTDoc is a derived field name except for the field named OTDocCAR. The rules and patterns for identifying field names which meet the criteria for derived metadata may be made arbitrarily complex. For example, suppose an entity must protect a large amount of documents related to an ongoing legal proceeding for the next 60 days. Derived data fields containing "CourtCaseDoc" may be searched for and prevented from being changed for the duration of the identified 60 days.

One advantage of pattern matching is that a user can define many derived metadata field names with a few patterns, which may be especially useful when the metadata field names are not explicitly known (e.g., when the system is first configured).

Further, derived metadata list 520 may be provided by a number of different mechanisms. In one embodiment, derived metadata list 520 may be generated from values stored in a configuration file. In another embodiment, each metadata item for each object might be marked in a way that identifies it as derived metadata. Essentially, the way that the derived metadata list is stored can be distributed in various ways, and it does not need to be the same list for each partition or for each object in the index.

Derived metadata list 520 may be defined and maintained in various ways. Non-limiting examples may include:
Use a programming interface (API) to define and manage the list.
Identify derived metadata values in an indexing request.
Define a known list of derived metadata values within the software (e.g., 'hard coded').
Manage a list of derived metadata in an external database or application, with which the search index components can interact to obtain the derived metadata values.

The above list is shown by way of example and is not exhaustive.

Derived metadata list 520 may be retained by the search components in persistent storage. In one embodiment, the list may be recreated each time the search components are started. Examples of locations in which the derived metadata list 520 can be retained include a configuration file, a distributed cache system, an external system, or within the search index itself.

In one embodiment, the analysis of the text to derive metadata occurs in a step prior to the generation of an indexing request. In another embodiment, deriving metadata from the text occurs at other locations in the indexing process. For example, the Indexing controller may contain or control functional components that perform the analysis of text to derive metadata.

For illustration purposes, Table 1 below contains examples of search index preparation steps that may generate derived metadata. This is information that may be derived primarily from text content, and may not be replaced when a "Replace Metadata" indexing command is received. In one example, when using Language Detection, a derived metadata field may be called "OTLanguage" with a value being "English."

By allowing for the replacement of the metadata portion associated with an object, without the replacement of the text portion associated with the object, without corrupting the derived metadata, embodiments can provide a reduction of the load on the computer which performs the indexing tasks, a reduction of load on the computer which analyzes the text to derive metadata, and a reduction in the amount of information an attached application must provide to the indexing process for replacement operations.

The embodiment of FIG. 5 is provided by way of example. Indexing engine 220 may include any number of other modules to update and search an index. Indexing engine 220 may be a portion of a larger program, such as a document management program, may be a separate program or may be implemented according any suitable programming architecture. In one embodiment, the processes of

TABLE 1

| Types of Derived Metadata Fields | Purpose | Sample Values for Derived Metadata Fields |
| --- | --- | --- |
| Format Identification | Analyze the file format, mime types, file name extensions and other cues to accurately determine the type of a file. | Microsoft Word Adobe Acrobat PDF |
| Metadata Extraction | Apply a filter that can parse a known file type to extract metadata that is included in the file. | Word: Author, date saved JPEG: Camera, image pixels, date photographed |
| Language Detection | Analyze the text to guess which language was used to write the content with a confidence score. | English German 60% |
| Sentiment Analysis | Apply language rules to determine whether text is positive, negative or neutral. | Positive 30% |
| Keywords/Concepts | Use semantic or statistical methods to identify keywords or concepts that the text relates to. | Financial services Mortgage defaults |
| Entity Extraction | Apply language rules and known lists to identify significant people, places or events in the content. | George Bush Christmas Chicago, IL |
| Geotagging | Create a list of the geospatial coordinates that represent the most likely locales in the content or metadata. | +27.5916+086.5640+8850/ +40.6894−074.0447/ |
| Classification | Apply business rules and patterns to identify the most likely classification of the record. | Contract Customer complaint Census form |
| Similarity | Generate codes that can be used to help match documents that are identical or have similar sections. | 817728fe34 8992783476 |
| File Information | Attributes of the file, such as the file name and size. | Size: 899458 Name: test.doc |

The embodiments disclosed herein are advantageous over previous solutions. For optimization reasons, requests to replace only the metadata or replace only the text content for an object may be given to the search Index. One previous solution involves incorporating derived metadata into the text portion of the search Index. For example, derived classification values may be appended to the text. The problem that arises in this previous solution is that a user may not be able to search specifically in the metadata field and this reduces the accuracy and capabilities of the search index.

Another previous solution is to replace both the text and metadata associated with an object at once. Replacing text and metadata at once loses the performance capability of the search index. Replacement is slower since both text and metadata must be replaced for the object. As a result, performance optimization is not possible.

indexing engine 220 may be distributed across multiple computer systems. Other alternative embodiments are also possible.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A computerized search system, comprising:
a search engine embodied on non-transitory computer-readable memory;
at least one processor;
a storage unit storing a search index and instructions; and
stored instructions, wherein the stored instructions when translated by the at least one processor instruct the search engine to:
receive an indexing request associated with an object;
identify any derived metadata fields in the search index that would be affected by the indexing request associated with the object;
determine whether any of the identified derived metadata fields in the search index that would be affected by the indexing request associated with the object are within a list or record of protected metadata fields;
retain any of the identified derived metadata fields in the search index that would be affected by the indexing request associated with the object and that are determined to be within the list or record of protected metadata fields such that any of the identified derived metadata fields in the search index thus retained are protected from change caused by the indexing request associated with the object; and
execute an indexing command to update the search index with data associated with the object and without any of the identified derived metadata fields in the search index thus retained by the search engine such that the search index is updated without the search engine deleting or changing any value of the derived metadata fields in the search index that have been identified by the search engine as would be affected by the indexing request associated with the object and that have been determined by the search engine to be associated with the list or record of protected metadata fields, the data comprising text, metadata, or both.

2. The computerized search system of claim 1, wherein the list or record of protected metadata fields that are to be protected from change includes a metadata field derived by analyzing at least one of a file format, mime type, or file name extension to determine a file type for the object.

3. The computerized search system of claim 1, wherein the list or record of protected metadata fields that are to be protected from change includes a metadata field derived by applying a filter to parse a known file type to extract metadata that is included in the object.

4. The computerized search system of claim 1, wherein the list or record of protected metadata fields that are to be protected from change includes a metadata field derived by:

analyzing the text to determine at least one language of the text; and calculating a confidence score for the determined language.

5. The computerized search system of claim 1, wherein the list or record of protected metadata fields that are to be protected from change includes a metadata field derived by applying language rules to determine whether language in the text is positive, negative, or neutral.

6. The computerized search system of claim 1, wherein the list or record of protected metadata fields that are to be protected from change includes a metadata field derived by identifying keywords or concepts in the text using semantic or statistical methods.

7. The computerized search system of claim 1, wherein the list or record of protected metadata fields that are to be protected from change includes a metadata field derived by applying language rules or known lists to identify significant people, places, or events in the data.

8. The computerized search system of claim 1, wherein the list or record of protected metadata fields that are to be protected from change includes a metadata field derived by creating a list of geospatial coordinates that represent probable locales in the data.

9. The computerized search system of claim 1, wherein the list or record of protected metadata fields that are to be protected from change includes a metadata field derived by applying business rules and patterns to identify a most likely classification of the object.

10. The computerized search system of claim 1, wherein the list or record of protected metadata fields that are to be protected from change includes a metadata field derived by generating a code that can be used to match documents that have similar or identical sections.

11. A computer program product comprising at least one non-transitory computer-readable medium storing instructions translatable by at least one processor of a computerized search system for instructing a search engine of the computerized search system to:

receive an indexing request associated with an object;

identify any derived metadata fields in a search index that would be affected by the indexing request associated with the object, the search index stored in a storage unit of the computerized search system;

determine whether any of the identified derived metadata fields in the search index that would be affected by the indexing request associated with the object are within a list or record of protected metadata fields;

retain any of the identified derived metadata fields in the search index that would be affected by the indexing request associated with the object and that are determined to be within the list or record of protected metadata fields such that any of the identified derived metadata fields in the search index thus retained are protected from change caused by the indexing request associated with the object; and execute an indexing command to update the search index with data associated with the object and without any of the identified derived metadata fields in the search index thus retained by the search engine such that the search index is updated without the search engine deleting or changing any value of the derived metadata fields in the search index that have been identified by the search engine as would be affected by the indexing request associated with the object and that have been determined by the search engine to be associated with the list or record of protected metadata fields, the data comprising text, metadata, or both.

12. The computer program product of claim 11, wherein the list or record of protected metadata fields that are to be protected from change includes a metadata field derived by analyzing at least one of a file format, mime type, or file name extension to determine a file type for the object.

13. The computer program product of claim 11, wherein the list or record of protected metadata fields that are to be protected from change includes a metadata field derived by applying a filter to parse a known file type to extract metadata that is included in the object.

14. The computer program product of claim 11, wherein the list or record of protected metadata fields that are to be protected from change includes a metadata field derived by:

analyzing the text to determine at least one language of the text; and calculating a confidence score for the determined language.

15. The computer program product of claim 11, wherein the list or record of protected metadata fields that are to be protected from change includes a metadata field derived by applying language rules to determine whether language in the text is positive, negative, or neutral.

16. The computer program product of claim 11, wherein the list or record of protected metadata fields that are to be protected from change includes a metadata field derived by identifying keywords or concepts in the text using semantic or statistical methods.

17. The computer program product of claim 11, wherein the list or record of protected metadata fields that are to be protected from change includes a metadata field derived by applying language rules or known lists to identify significant people, places, or events in the data.

18. The computer program product of claim 11, wherein the list or record of protected metadata fields that are to be protected from change includes a metadata field derived by creating a list of geospatial coordinates that represent probable locales in the data.

19. The computer program product of claim 11, wherein the list or record of protected metadata fields that are to be protected from change includes a metadata field derived by applying business rules and patterns to identify a most likely classification of the object.

20. The computer program product of claim 11, wherein the list or record of protected metadata fields that are to be protected from change includes a metadata field derived by generating a code that can be used to match documents that have similar or identical sections.

* * * * *